United States Patent [19]
Schwab et al.

[11] 3,877,172

[45] Apr. 15, 1975

[54] FOAMED PLASTIC PROFILE MEMBER FOR HYDROPONIC CULTIVATION AND GROWTH OF PLANTS

[75] Inventors: Johann Schwab; Friedrich Böhm; Gerlinde Ruthner; Kurt Büchel; Georg Widtmann, all of Vienna, Austria

[73] Assignee: Semperit AG, Vienna, Austria

[22] Filed: Feb. 26, 1973

[21] Appl. No.: 335,463

[52] U.S. Cl. .................... 47/1.2; 47/37; 47/DIG. 7
[51] Int. Cl. ............................................ A01g 31/00
[58] Field of Search ........ 47/1.2, 34, 37, 56, DIG. 7

[56] References Cited
UNITED STATES PATENTS 2,988,441  6/1961  Pruitt .............................. 47/DIG. 7
3,362,106  1/1968  Goldring ............................... 47/56

FOREIGN PATENTS OR APPLICATIONS
2,041,192  3/1971  Germany ................................ 47/37
7,014,511  4/1971  Netherlands ........................... 47/1.2

*Primary Examiner*—Robert E. Bagwill
*Attorney, Agent, or Firm*—Werner W. Kleeman

[57] ABSTRACT

A foamed plastic profile member as the carrier substance for the root space or accommodation during the hydroponic cultivation and growth of plants wherein the profile member is formed of one piece and — viewed in cross-section — possesses at its edge a recess bounded by a diaphragm at the side facing away from the profile member.

15 Claims, 8 Drawing Figures

FOAMED PLASTIC PROFILE MEMBER FOR HYDROPONIC CULTIVATION AND GROWTH OF PLANTS

BACKGROUND OF THE INVENTION

The present invention relates to a new and improved device for the cultivation of plants with a root space which is enclosed and a sprout space, wherein the root space is enclosed by a diaphragm or membrane and possesses a carrier substance for plants which at least partially consists of foamed plastic.

Plants and the like were raised independently of earth in salt solutions for the first time by Wilhelm Knop in approximately 1860. The field of hydroponics has since then been used primarily for scientific purposes. In this way there has been determined for certain plants what nutrients and trace elements are necessary and in what concentration they are required. More recently these experiments have been amplified through the use of isotopes. With these scientific experiments it was possible to determine that the growth of plants, when resorting to hydroponics, proceeds considerably more rapidly than in a normal earth culture. The reasons for this can be clearly recognized in terms of the fact that the roots can be supplied with the required substances in an optimum composition and optimum concentration. This advantage as concerns more rapid growth of plants could not heretofore be employed in an economical manner. Hydroponics have been and always will be employed for supplying humans with plants, for example vegetables, however, the use thereof has been limited to situations where the economics are of secondary importance. Thus, for instance, during the Polar Expedition in 1937 there was resorted to the hydroponic cultivation of plants. Also during the Second World War a hydroponic installation was placed into operation in the Ascension Islands for supplying personnel of the United States Air Force. The reason that hydroponic cultivation of plants has not yet been as effectively employed as desired is attributable to the fact that the installations are much too complicated in design and the gas content of the roots is neglected.

SUMMARY OF THE INVENTION

It is a primary object of the present invention to provide a new and improved device for the hydroponic cultivation and growth of plants which effectively overcomes the aforementioned drawbacks and limitations existent with the state-of-the-art proposals.

It is another and more specific object of this invention to provide a new and improved device for the hydroponic cultivation and growth of plants which is of relatively simple construction and design, and therefore easy to fabricate, and at the same time allows for an optimum gas content and an optimum supply of nutritive substances and trace elements.

Now in order to implement these and still further objects of the invention which will become more readily apparent as the description proceeds, the invention contemplates providing a foamed plastic profile or body member, which preferably consists of one piece, for the hydroponic cultivation and growth of plants and which is surrounded at the outside by a layer, for instance a foil, formed of water impervious material. This material, if desired, can possess perforations, pores or the like and wherein the foamed plastic is at least partially open pore.

If the cross-section of the profile or body member is trapezoidal then it is possible to accommodate the space requirements of the roots in a particuarly advantageous and favorable manner.

At the narrower of both parallel arranged surfaces or faces there can be provided crosswise cuts for receiving plants, seedlings or seeds, whereby there can then occur a particularly good and rapid embedding of the roots, and wherein at the same time there is taken into account that the plants only require very little space for the roots directly at the boundary surface between the root space and the space or region where there is located the green portion of the plant.

If there is provided at least one recess in the lengthwise direction of the body member then the effective surface of the body member is thereby increased, so that those surfaces are increased which serve for the material exchange with the surroundings.

It is particularly advantageous if the recess is arranged at the wider one of the surfaces or faces arranged parallel to one another since by doing so there is the least impairment of the growth of the roots.

If a hollow cavity or space is formed by the recess and the outside layer then in a particularly favorable manner there can be realized at such hollow space the infeed of nutritive solutions, gases and the like.

If the layer consists of a shrinkage foil then there is insured for an exact contact or bearing thereof at the foamed plastic member, and wherein, for instance, there is prevented localized accumulation of liquids or gases.

If the profile or body member consists of integral foam then there is realized the effect that an increased resistance opposes the roots, so that such tend to penetrate towards the outside, with the result that no or only few roots grow out of the foam.

The body member can also consist of a compound foam, with the result that there is realized the advantage that through the selection of flocks, the size of which is in the order of magnitude between 0.5 and approximately 1 cm., there can be obtained local regions which are particularly hydrophilic or hydrophobic respectively, and there also can be provided resistances for the roots so that the proportion of small roots increases.

If the foam of the body member possesses pores of different size, wherein the diameter of the small pores amounts to approximately less than 1 millimeter and less than one-quarter of the diameter of the large pores then there is thus accommodated in a particularly favorable manner both the liquid content and the gas content.

If the large pores are present at the foamed plastic pieces of the compound foam, whereas the small pores are present at the foam connecting the foamed plastic pieces, then there is attained a particularly suitable form of compound foam wherein the proportion of small pores and large pores can be fixed relatively simply through the manufacture of the compound foam.

If the preferably foamed binder is hydrophilic there is thus realized a retention of the nutritive solution between the foamed plastic pieces and the binder, so that upon withdrawal of the nutritive solution there is attained a water vapor saturated atmosphere in the pores of the foamed plastic pieces.

If fillers are bound in the foamed plastic material then there can be realized a further variation in the properties of the foamed plastic profile. Thus, for instance, by adding cellulose fiber powder or dust it is possible to increase the hydrophilic properties, by adding carbon black there can be increased the absorption capability for thermal radiation, by adding quartz sand or the like there can be influenced the growth of the roots.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
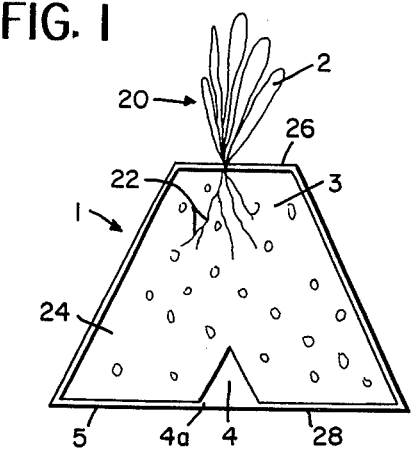
FIG. 1 is a cross-sectional view of a first embodiment of foamed plastic profile or body member for the hydroponic cultivation and growth of plants.

Describing now the drawings the profile or body member 1 depicted in FIG. 1, by way of example, comprises a foamed plastic formed on the basis of polyurethane, and wherein there can be specifically employed any polyether urethane or polyester urethane. There can be, however, employed other foamed plastics, such as polyvinyl chloride, polyvinyl acetate, urea formaldehyde resins or cellulose. A plant 20 grows in this foamed plastic profile or body member 1 and its roots 22 are anchored in the foam material 24. The plant sprout 2 is arranged approximately at the center of the upper surface 26. In the case of salad it is sufficient if the upper surface 26 of the body member 1 possesses a width of approximately 3 centimeters, whereas the width of the lower surface 28, where there is arranged the recess 4, should amount to about 3 times the above value. The spacing of both surfaces 26 and 28 from one another amounts to approximately twice the width of the upper surface 26. By means of a foil 5 defining a diaphragm and the recess 4 there is formed a hollow space or channel 4a serving for the infeed and withdrawal of a nutritive solution. This channel can also be employed for the infeed of air.

Figure 2:
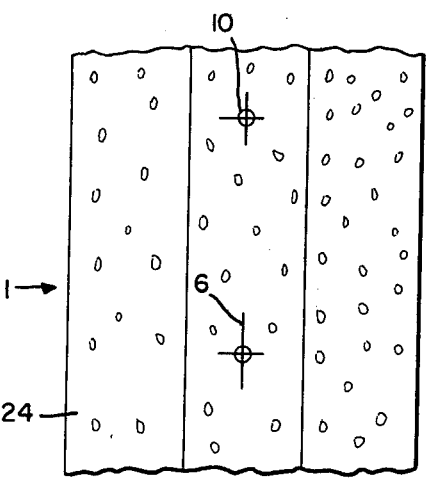
FIG. 2 is a fragmentary top plan view of the foamed plastic body member depicted in FIG. 1.

As best seen by referring to FIG. 2, the foamed plastic body member 1 possesses crosswise slots 6 for receiving the plant seeds and the seedlings. The diaphragm or membrane layer which is a foil 5, arranged about the body member 1, possesses at the region of the center of the crosswise slots a circular or round opening 10. This foil 5 can be, for instance, a shrinkage foil, whereby in such case the openings 10 are first then produced during the planting of the foam plastic profile member 1. Suitable materials for the shrinkage foil are, for instance, pre-cross-linked, double-stretched foils formed of polyethylene, polypropylene and polyester.

Figure 3:
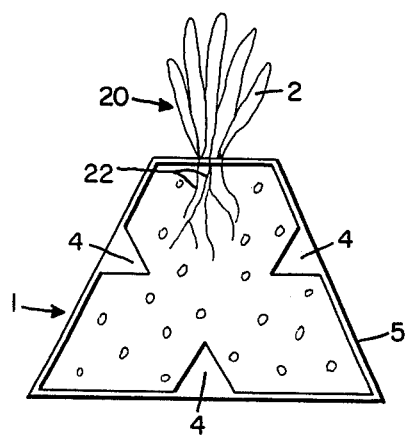
FIG. 3 is a cross-sectional view of a variant embodiment of foamed plastic body member.

Now the modified form of foamed plastic body member 1 depicted in FIG. 3 possesses three recesses 4. The lower arranged recess 4 serves for the infeed and withdrawal of the nutritive solution, whereas both of the other recesses 4 are primarily of significance as concerns the gas content.

Figure 4:
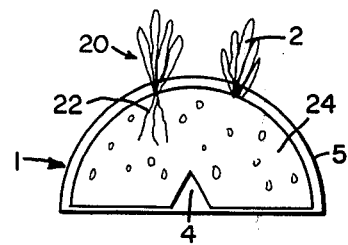
FIG. 4 is a cross-sectional view of a further embodiment of foamed plastic body member.
Figure 5:
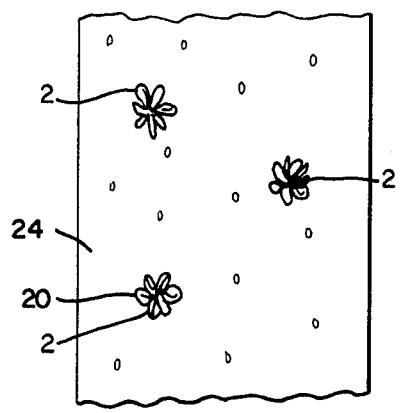
FIG. 5 is a top plan view of the foamed plastic body member depicted in FIG. 4.

The foamed plastic body member 1 of FIGS. 4 and 5 possesses approximately a semi-circular shaped cross-sectional configuration, and wherein the plants 20, as best seen by referring to FIG. 5, are arranged in a zig-zag formation in the body member. Due to this zig-zag formation of the plants 20 there is obtained a partial overlapping of the root spaces of the different plants, so that a greater number of plants can be planted at the foamed plastic body member 1.

Figure 6:
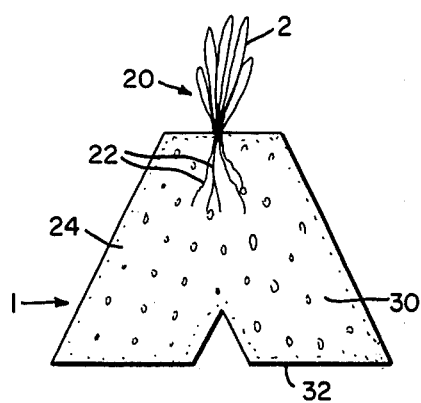
FIG. 6 is a cross-sectional view of another embodiment of foamed plastic body member.
Figure 7:
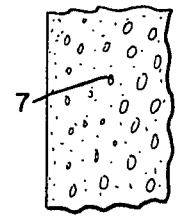
FIG. 7 schematically illustrates in fragmentary view the formation of an integral foam.

The body member 1 depicted in FIG. 6 consists of a so-called integral foam, in other words a foam 24 having a cellular core 30 and closed cover layer 32 formed of the same material. It will be understood that the foam 24 is provided at the outside with a skin i.e. layer 32 which is almost free of pores and which is integrally foamed or connected with the core 30, the size of the pores 7 of the core 30 increases over a shorter distance in the direction of the interior of the body member 1, as best seen by referring to FIG. 7. As the starting materials for producing a polyurethane integral foam there can be employed partially branched polyols having a molecular weight between about 3000 and 6000 and an OH-number in the range of 30 to 40, low molecular cross-linking polyols with a molecular weight up to 1000 and an OH-number up to 600, polyisocyanates (2, 4- and 2,6-toluene-diisocyanate and its isomer mixtures, 4,4'-diphenylmethane diisocyanate) as well as a blowing agent (especially monoflurotrichloromethane). An integral foam can be formed, for instance, of the following composition: 190 parts by weight polyether polyol, molecular weight 5000, OH-number 35; 17 parts by weight polyether polyol, molecular weight 800, OH-number 500; 53 parts by weight monofluorotrichloromethane; 47 parts of a mixture of 80 parts 2,4-toluene-diisocyanate and 20 parts 2,6-toluene-diisocyanate; and 0.5 parts by weight dibutyl tin dilaurate.

Figure 8:
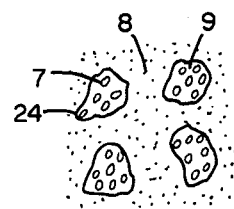
FIG. 8 schematically illustrates in fragmentary view a compound foam.

FIG. 8 illustrates a modified form of foamed plastic body member 1 consisting of a compound or composite foam material 24. It will be recognized that the foamed plastic pieces 9, possessing large pores 7, are held together by a hydrophilic foamed binder 8 which possesses micropores. The compound foam can be produced for instance according to the following composition:

80.00 kg. polyurethane foam (grain size ≤ 10 mm.)

13.00 kg. polyether polyol (molecular weight 3500, OH-number 40)

5.00 kg. of a mixture of 8 parts 2,4- toluene diisocyanate and 20 parts 2,6-toluene diisocyanate;

2.5 parts by weight ethylene acetate; and 0.05 parts dibutyl tin dilaurate

As the polyol there can be employed all of the polyols which are conceivable in the diisocyanate chemistry; essentially there should be employed those with a molecular weight between 3000 and 6000 and an OH-number between 30 and 50, and in principle both polyesters as well as also polyether polyols. As the isocyanate there can be employed, apart from the used mixture, also other mixture ratios of the 2,4-and 2,6-toluene diisocyanates as well as also 4,4'-diphenylmethane diisocyanate and mixtures of the above.

The aforementioned foamed hydrophilic binder 8 is a polyether-polyurethane, the polyol component of which possesses a high proportion of polyethylene glycol in the chain. In other words, the monomers employed for the polymerization of the polyether polyol contain 10–75% ethylene oxide. The greater the amount of ethylene oxide, that is to say, the greater the amount of polyethylene glycol present in the polyether polyol chain, the greater the hydrophility of the binder. The hydrophility of the binder should be as great as possible.

As indicated above, the foamed plastic body member can be provided with fillers. Examples of fillers suitable for the purposes of the invention are vermiculite, montmorillonite as well as perlite.

The layer of the foamed plastic body member, as explained above, can be for instance realized by encasing the profile member with a foil as indicated above. Furthermore, the possibility exists of producing the so-called integral foam wherein then the skin of the integral foam constitutes the outer layer or foil. Of course, there is also available the possibility of forming a profile or body member which is cut for instance from a block and provided with the diaphragm layer by immersion, coating, spraying or the like.

Foamed materials which are particularly suitable for forming the profile or body member are those formed on the basis of polyurethane as explained herein. In the case of a foamed plastic body member formed as a compound foam it is possible also to employ, for instance, foamed plastic pieces formed on the basis of polystyrene, urea formaldehyde resins, but also inorganic foamed materials.

Foamed materials which have been found to be particularly suitable for the purposes of the invention are those whose structure is similar to that of a bathing sponge, that is to say, there are present large pores which are in communication with one another, the walls of which are formed by lamellae and which of themselves possess small, at least partially open pores. It has been found that such structure is particularly beneficial for the growth of plants.

While there is shown and described present preferred embodiments of the invention, it is to be distinctly understood that the invention is not limited thereto, but may be otherwise variously embodied and practiced within the scope of the following claims. Accordingly,

What is claimed is:

1. A foamed plastic body member serving as a carrier substance for the root space during the hydroponic cultivation and growth of plants, comprising an elongated porous body member being formed of one piece and, viewed in cross-section, being provided at its edge with at least one recess extending the length of said body member forming a continuous channel which extends into said body for continuously feeding nutrients to said body, a diaphragm bounding the recess at a side facing away from the body member wherein a hollow space is formed by the recess and the diaphragm.

2. The foamed plastic body member as defined in claim 1, wherein the body member possesses a substantially trapezoidal-shaped cross-sectional configuration.

3. The foamed plastic body member as defined in claim 2, wherein crosswise slots are provided at the narrower surface of the two surfaces of the trapezoidal-shaped body member which are arranged parallel to one another, said crosswise slots serving for the reception of plants, seedlings or seeds.

4. The foamed plastic body member as defined in claim 2, wherein the recess is provided at the wider of two surfaces of the body member which are arranged substantially in parallelism with one another.

5. The foamed plastic body member as defined in claim 1, wherein the diaphragm is a shrinkage foil.

6. The foamed plastic body member as defined in claim 1, wherein the body member comprises an integral foam.

7. The foamed plastic body member as defined in claim 1, wherein the body member comprises a compound foam.

8. The foamed plastic body member as defined in claim 7, wherein the compound foam possesses a hydrophilic binder.

9. The foamed plastic body member as defined in claim 8, wherein the hydrophilic binder is a foamed.

10. The foamed plastic body member as defined in claim 1, wherein the foamed material of the body member possesses pores of different size, wherein the diameter of the smaller pores amounts to approximately less than one millimeter and amounts to less than one-quarter of the diameter of the larger pores.

11. The foamed plastic body member as defined in claim 10, wherein the diameter of the smaller pores is below approximately 0.5 millimeters.

12. The foamed plastic body member as defined in claim 10, wherein the larger pores are present at foamed plastic pieces of a compound foam while the smaller pores are present in the foam material connecting the foamed plastic pieces.

13. The foamed plastic body member as defined in claim 1, wherein the foamed material contains fillers.

14. The foamed plastic body member as defined in claim 13, wherein the fillers comprise a material selected from the group comprising vermiculite, montmorillonite and perlite.

15. A carrier for plant roots comprising:
a unitary, elongated, porous body of foamed plastic construction having a flat base portion and side walls which extend upwardly from opposite ends of said base tapering towards each other;
recess means in at least one surface of said body which projects into said body for a predetermined distance and extends the length of said body forming a continuous channel into said body for continuously feeding nutrients to said body;
said body being covered with a substantially fluid impermeable membrane.

* * * * *